United States Patent Office 3,711,427
Patented Jan. 16, 1973

3,711,427
CATALYTIC BED COATED WITH METAL FOR GAS GENERATOR
James A. Murfree, Jr., and William A. Duncan, Huntsville, Ala., assignors to the United States of America as represented by the Secretary of the Army
No Drawing. Filed Oct. 1, 1969, Ser. No. 863,758
Int. Cl. B01j 11/40
U.S. Cl. 252—455 R     3 Claims

ABSTRACT OF THE DISCLOSURE

An inert porous material with decomposed products from a manganese carbonyl compound deposited thereon to form a catalytic bed for liquid gas generators that utilize hydrazine type fuels.

BACKGROUND OF THE INVENTION

In the past, liquid gas generators have utilized inert beds with a catalyst such as the Shell 405 catalyst and inert beds with various oxidizing agents such as $HIO_3$ and $K\,MnO_4$. In these type gas generation schemes, the catalytic beds are very expensive, and the inert beds with oxidizing agents have limitations as to the number of times they can be restarted. Some of these arrangements are also very expensive due to the chemicals used therein. Accordingly, a need exists for a relatively cheap and reliable catalytic bed that has the ability to cause hydrazine to decompose on a multiplicity of starts of the gas generator.

Therefore, it is an object of this invention to provide a catalytic bed that utilizes chemicals that are relatively cheap.

Another object of this invention is to provide a catalytic bed that can be used for starting and sustaining decomposition for a multiplicity of times with a monopropellant fuel.

A further object of this invention is to provide a catalytic bed that is relatively easy to make and that can be made with varying amounts of the catalytic agent therein.

Still another object of this invention is to provide a catalytic bed that can be used even after periods of storage.

SUMMARY OF THE INVENTION

In accordance with this invention, an inert porous support material such as fire brick or various corrugated ceramics is saturated with a liquid metal carbonyl compound, and thereafter, the carbonyl compound is decomposed such as by burning to leave a residue of metals and/or metal oxides on the inert porous support material. When a monopropellant such as hydrazine is brought into contact with the catalytic bed, a rapid heating to a red glow occurs and then ignition.

DETAILED DESCRIPTION OF THE INVENTION

It has been discovered that metal carbonyl compounds in the form of a liquid can be used as a means of depositing a catalytic coating of a metal on a gas generator bed or support. This technique is applied to the "chemi-thermo" type gas generator. Briefly, this gas generator concept involves the thermal decomposition of an exothermic monopropellant such as hydrazine on a porous bed or support such as insulating firebrick or various corrugated ceramics. The scheme depends on a hypergolic reaction between the propellant and a chemical initiator to heat the bed to a temperature at which the propellant will sustain thermal decomposition on the hot surface.

The liquid metal carbonyl compound that has been found to be very successful as a catalyst is methylcyclopentadienyl manganese tricarbonyl $[C_6H_7Mn(CO)_3]$. A liquid such as this lends itself readily to the deposition of a uniform coating of a catalytic metal on the surface of a porous support such as insulating firebrick or various corrugated ceramics which have porous walls. The metal carbonyl is poured over the porous support which absorbs the liquid like a sponge until it is saturated.

The liquid is then decomposed by some means, such as burning, allowing the organic part of the carbonyl compound to burn off, but leaving a coating of manganese and/or the oxides of manganese deposited on the surface of the support. The weight of the deposit may be varied according to the number of applications as above.

Insulating firebrick with a porosity of approximately 73 percent work well, and insulating firebrick with a porosity from 50–80% can be used. Zircon mullite corrugated ceramic with a wall porosity of 25–30 percent also works well. When the mullite ceramic material is used, it is used as a multiplicity of turns so that an overall unitary structure of ceramic with the spaces defined between each wall has an overall porosity of from 60 to 90 percent depending upon the closeness of the walls to each other.

Injection of hydrazine ($N_2H_4$) onto the coated support results in rapid heating to a red glow and ignition. The metal coating, being catalytic, is not consumed. After combustion of the propellant is completed and the support has cooled down to ambient temperature, subsequent additions of hydrazine have the same result. Samples have been tested successfully dozens of times with hydrazine over an extended period.

The real advantages of this gas generator catalyst over other gas generator catalysts is a combination of low cost and the ability to decompose the storable hydrazine propellants, monomethyl hydrazine ($CH_3NHNH_2$ or MMH) and MHF–3 (86 wt. percent MMH—14 wt. percent $N_2H_4$). As with hydrazine the catalyst has been tested successfully with these propellants many times. The catalyst disclosed herein appears far superior in its reaction with these storable propellants to any of the commercially available catalysts.

We claim:
1. A catalytic bed, for liquid gas generators, comprising an inert porous support material with a catalytic substance deposited thereon, said catalytic substance being the residue remaining from the thermal decomposition of methylcyclopentadienyl manganese tricarbonyl.
2. A catalytic bed as set forth in claim 1 wherein said inert porous support material is porous firebrick with a porosity from 50–80 percent.
3. A catalytic bed as set forth in claim 1 wherein said inert porous support material is zircon mullite corrugated ceramic with a wall porosity from 25–30 percent.

References Cited
UNITED STATES PATENTS

| | | | |
|---|---|---|---|
| 3,398,101 | 8/1968 | Baker et al. | 60—219 X |
| 3,460,348 | 8/1969 | Proell | 60—219 X |
| 3,488,962 | 1/1970 | McCormick | 60—219 X |
| 3,503,212 | 3/1970 | Jennings et al. | 60—219 X |
| 3,407,604 | 10/1968 | Keith et al. | 60—219 X |

CARL D. QUARFORTH, Primary Examiner
S. J. LECHERT, Jr., Assistant Examiner

U.S. Cl. X.R.
252—461, 471; 117—62, 98, 160; 60—219